US011165677B2

(12) United States Patent
Malboubi et al.

(10) Patent No.: US 11,165,677 B2
(45) Date of Patent: Nov. 2, 2021

(54) PACKET NETWORK PERFORMANCE MONITORING (71) Applicant: AT&T Intellectual Property I, L.P., Atlanta, GA (US)

(72) Inventors: Mehdi Malboubi, San Ramon, CA (US); Abhijeet Bhorkar, Fremont, CA (US); Baofeng Jiang, Pleasanton, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 155 days.

(21) Appl. No.: 16/164,228

(22) Filed: Oct. 18, 2018

(65) Prior Publication Data
US 2020/0127906 A1    Apr. 23, 2020

(51) Int. Cl.
H04L 12/26    (2006.01)
G06F 11/34    (2006.01)

(52) U.S. Cl.
CPC .......... *H04L 43/08* (2013.01); *H04L 43/0852* (2013.01); *H04L 43/0882* (2013.01); *H04L 43/0888* (2013.01); *G06F 11/3433* (2013.01)

(58) Field of Classification Search
CPC . H04L 43/08; H04L 43/0852; H04L 43/0882; H04L 43/0888; G06F 11/3433
See application file for complete search history.

(56) References Cited

U.S. PATENT DOCUMENTS 6,885,642 B1 *  4/2005  Jain ...................... H04L 45/121
                                                          370/252
7,292,537 B2   11/2007  Charcranoon
(Continued)

FOREIGN PATENT DOCUMENTS

WO   2017092780 A1   6/2017
WO   2017211169 A1   12/2017
(Continued)

OTHER PUBLICATIONS

Breitbart, Yuri, et al. "Efficiently monitoring bandwidth and latency in IP networks." INFOCOM 2001. Twentieth Annual Joint Conference of the IEEE Computer and Communications Societies. Proceedings. IEEE. vol. 2. IEEE, 2001. https://www.computer.org/csdl/proceedings/infcom/2001/7016/02/00916285.pdf.

Zhao, Jerry, and Ramesh Govindan. "Understanding packet delivery performance in dense wireless sensor networks." Proceedings of the 1st international conference on Embedded networked sensor systems. ACM, 2003. http://web.eecs.umich.edu/~zmao/eecs598-4/papers/zhao03.pdf.

Wang, Guohui, and TS Eugene Ng. "The impact of virtualization on network performance of amazon ec2 data center." Infocom, 2010 proceedings ieee. IEEE, 2010. http://www.cmlab.csie.ntu.edu.tw/~jimmychad/CN2011/Readings/Virtualization.pdf.

(Continued)

*Primary Examiner* — Walter J Divito
*Assistant Examiner* — Anthony Luo (57) ABSTRACT

A processing system having at least one processor may obtain, from at least one probe packet, path measurements among pairs of host devices of a plurality of host devices in a packet network comprising a plurality of links, and compose a plurality of linear equations, each linear equation relating one of the path measurements between a respective pair of host devices to at least one link performance indicator for a corresponding one or more of the links in the packet network between the respective pair of host devices. The processing system may then determine a plurality of link performance indicators for the plurality of links via a solution to the plurality of linear equations, the plurality of link performance indicators including the at least one link performance indicators of each of the linear equations, and generate a report comprising at least one of the plurality of link performance indicators.

20 Claims, 5 Drawing Sheets

(56) References Cited

U.S. PATENT DOCUMENTS

| | | |
|---|---|---|
| 7,457,868 B1 | 11/2008 | Guo |
| 7,792,083 B2 | 9/2010 | Bordonaro et al. |
| 7,796,524 B1 | 9/2010 | O'Connell et al. |
| 8,005,011 B2 | 8/2011 | Yang |
| 8,023,421 B2 | 9/2011 | Lloyd et al. |
| 8,451,745 B2 | 5/2013 | Weng et al. |
| 9,313,098 B1* | 4/2016 | Lazarescu ........... H04L 41/0806 |
| 9,503,344 B2 | 11/2016 | Chakrabarti et al. |
| 9,699,062 B2 | 7/2017 | Cociglio |
| 9,787,559 B1 | 10/2017 | Schroeder |
| 9,929,949 B2 | 3/2018 | Mahadevan et al. |
| 2015/0149627 A1* | 5/2015 | Zhao ................. H04W 36/0061 709/224 |
| 2015/0289176 A1* | 10/2015 | Liu ....................... H04W 24/02 370/331 |
| 2016/0226742 A1 | 8/2016 | Apathotharanan et al. |
| 2017/0215094 A1 | 7/2017 | Akoum et al. |
| 2017/0250887 A1 | 8/2017 | Sadana et al. |
| 2017/0324622 A1 | 11/2017 | Ubaldi et al. |

FOREIGN PATENT DOCUMENTS

| | | |
|---|---|---|
| WO | 2018049649 A1 | 3/2018 |
| WO | 2018115934 A1 | 6/2018 |

OTHER PUBLICATIONS

Boris Rogier, "Measuring network performance: links between latency, throughput and packet loss", www.performancevision.com, Sep. 20, 2018. https://web.archive.org/web/20180920184601/https://www.performancevision.com/blog/measuring-network-performance-latency-throughput-packet-loss/.

* cited by examiner

$$Y \begin{bmatrix} yH1H2 \\ yH1H3 \\ yH1H4 \\ yH2H3 \\ yH4H3 \end{bmatrix} = \begin{bmatrix} x1 + x2 \\ x1 + x3 + x5 \\ x1 + x4 + x5 \\ x2 + x3 + x5 \\ x3 + x4 \end{bmatrix} = \begin{bmatrix} R \\ 1\ 1\ 0\ 0\ 0 \\ 1\ 0\ 1\ 0\ 1 \\ 1\ 0\ 0\ 1\ 1 \\ 0\ 1\ 1\ 0\ 1 \\ 0\ 0\ 1\ 1\ 0 \end{bmatrix} \begin{bmatrix} X \\ x1 \\ x2 \\ x3 \\ x4 \\ x5 \end{bmatrix}$$

PACKET NETWORK PERFORMANCE MONITORING

The present disclosure relates generally to active measurements of performance indicators in a packet network, and more particularly to methods, non-transitory computer-readable media, and processing systems for determining a plurality of link performance indicators from a plurality of path measurements.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, computer-readable medium, and processing system for determining a plurality of link performance indicators from a plurality of path measurements. For example, a processing system having at least one processor may obtain, from at least one probe packet, a plurality of path measurements among respective pairs of host devices of a plurality of host devices in a packet network comprising a plurality of links, and compose a plurality of linear equations, each of the linear equations relating one of the plurality of path measurements between a respective pair of host devices of the plurality of host devices to at least one link performance indicator for a corresponding one or more of the plurality of links in the packet network between the respective pair of host devices. The processing system may then determine a plurality of link performance indicators for the plurality of links of the packet network via a solution to the plurality of linear equations, where the plurality of link performance indicators comprises the at least one link performance indicator of each of the plurality of linear equations, and generate a report comprising at least one of the plurality of link performance indicators.

The present disclosure provides an architecture for active measuring and estimating of performance indicators (e.g., key performance indicators (KPIs)) in a packet network, such as packet delay (e.g., host-to-host latency), packet loss, or packet throughput, under network measurement resource constraints, such as limited use of network bandwidth. In one example, a network controller determines a set of minimum optimal measurement paths from which the performance indicators can be measured, and where individual performance indicators can also be estimated using network inference techniques. Optimal measurement paths are provided in a way that a sufficient number of independent end-to-end paths are measured so that unknown performance indicators can be computed with high accuracy via applying network inference techniques. Accordingly, the overhead of network measurement is significantly reduced compared to traditional approaches. In addition, examples of the present disclosure are capable of providing fine-grained performance indicators for host-to-host, device-to-device, and/or virtualized component-to-virtualized component measurements (e.g., between virtual machines, containers, or the like).

In one example, the packet network may include both probing agents and forwarding agents. For instance, hosts that are efficient in computation may be configured as probing agents while other hosts may be configured as forwarding agents with minimal computation requirements, and which do not communicate directly with the network controller for path measurements. In one example, the network controller may configure the probing agents and forwarding agents that are distributed across the packet network. In one example, probing agents and forwarding agents may be realized in different ways, for example, as separate virtual machines (VMs), as applications or services in a host operating system, as "containers" (e.g., for Docker, Kubernetes, etc.) that may consume less computation resources than VMs but that may provide sufficient resource separation from other services in the host, and so on. In one example, forwarding agents utilize less resources (e.g., processor and/or memory resources) as compared to the probing agents. In addition, in one example, the network controller connects only to the probing agents. Thus, the communication overhead between the network controller and agents is reduced since the number of probing agents is less than the number of forwarding agents. As such, performance indicator measurements may be obtained more efficiently compared to having probing agents configured on all hosts involved in the performance indicator measurements.

In accordance with the present disclosure, a link may comprise a connection between two nodes in a packet network and may represent a wired connection, e.g., a fiber-optic cable, an AirGig connection, etc., or a wireless connection, e.g., wireless wide area network (WWAN) connection, such as in accordance with Institute of Electrical and Electronics Engineers (IEEE) 802.16, or the like. Nodes may comprise host and non-host devices in the packet network that process network traffic (e.g., routers, switches, application servers, etc., which may be virtual or non-virtual components). In one example, a link may also comprise a virtual link, e.g., a connection between two nodes on a same host device. A host (or host device) comprises a physical device that processes network traffic in the packet network and that has an agent (e.g., a probing agent and/or forwarding agent) deployed thereon. An agent comprises a probing agent or a forwarding agent, and may comprise a hardware/software object (e.g. host, VM, application, container, network device, etc.). In one example, an agent may also be assigned an Internet Protocol (IP) address that may be different from that of the host. A path comprises a sequence of hosts, and implicitly defines links (and non-host devices, if any) between hosts. A path includes at least an originating probing agent and a terminating probing agent. In one example, the originating probing agent and the terminating probing agent may be the same probing agent.

Probing agents may actively generate and send a probe packet over a path designated by the network controller. In one example, a pre-determined path is encoded in the payload of the probe packet as a sequence of host and/or agent IP addresses. For example, the source probing agent may generate the probe packet having a destination of the next agent (e.g., a forwarding agent or another probing agent) and a payload comprising the IP addresses of the agents in the path and a time stamp of transmitting the probe packet. In one example, the network controller may randomly select the source and destination probing agents among a set of hosts/servers connected by one top-of-rack (TOR) switch/router. For instance, each rack may have at least one probing agent.

In one example, forwarding agents are configured to add timestamps and forward a probe packet to a next hop in a path, but do not originate or terminate the probe packet along the path. For example, a pre-determined path may be encoded in the payload of the probe packet as a sequence of host and/or agent internet protocol (IP) addresses. One or more agents in the path may receive the probe packet, encapsulate a receiving time and a transmission time of the probe packet in the payload and forward the probe packet to a next host comprising another agent. This process is repeated until the probe packet is received by a destination/terminating probing agent at the end of the path. The destination probing agent may then forward the probe packet, the information contained in the probe packet, and/or data calculated from the information contained in the probe packet to the network controller.

In one example, network path measurements may be collected by the network controller from probing agents at the terminal ends of the paths. Performance indicators of interest may then be calculated for certain links for which the measurements were directly obtained, and may be estimated for other links in the packet network using a system of linear equations (broadly a plurality of linear equations). For example, by subtracting the received and transmitted timestamps of the corresponding hosts, the delay between hosts can be computed. Alternatively, or in addition, by comparing the number of transmitted and received packets, the packet loss rate between hosts can be computed. In addition, performance indicators may be calculated/estimated for links for which a direct measurement was not obtained and/or for which a direct measurement is not obtainable.

In one example, the forwarding agents (and/or probing agents that may be intermediate nodes in the path) may also encapsulate other information into the payloads of probe packets, such as time-to-live (TTL) of a received probe packet, the number of errors detected and/or corrected, or information about the current status of the host (e.g. host resource usage, including processor utilization, memory utilization, etc.), the amount of data received/transmitted in a time interval, and so forth. For example, the sequence of TTL numbers of probing/forwarding agents at the network controller can be used to determine the number of intermediate nodes between agents distributed in the packet network. Also, the number of errors detected and/or corrected can be used to determine the quality/reliability of the links between nodes. As another example, the network controller can estimate the load of a host from resource usage information encapsulated in the packet payload, or from the difference between the transmitted and received timestamps of the same host (i.e., transmission delay inside a host).

In one example, the forwarding agents (and/or probing agents that may be intermediate or source/termination probing agent in the path) may also incrementally encapsulate a percentage of packets lost over a configured time interval between the current agent and/or host and the previous agent and/or host. For example, the network controller can configure the interval. In one example, the agents may calculate the percentages of packets lost exclusively from probe packets. For instance, a plurality of probe packets may be sent over a same path, or a plurality of probe packets may be sent over paths that include a same path between two hosts. In another example, the host may compute the percentages of packets lost from both data packets (e.g., user data traffic, signaling traffic, etc.) and probe packets.

These performance indicators may be used in a number of network applications, such as network anomaly detection and troubleshooting, network load balancing, resource allocation, traffic engineering and/or traffic routing, and so on. For example, in a software defined network (SDN), rapid changes in the network environment may call for more frequent performance indicator measurements and estimation. While it may be possible to measure at all nodes in the network for all links between nodes, this may be unfeasible in large scale networks due to the high overhead and complexity for obtaining network measurements. For instance, in a network with n nodes, direct measurement techniques may use $O(n^2)$ end-end measurements to actively determine performance indicators between nodes. Hence, the number of probe packets significantly increases the measurement overhead in large-scale networks due to performing redundant measurements. In contrast, example of the present disclosure use $O(n)$ end-to-end measurements for measuring and estimating one or more performance indicators (e.g., latency, packet loss, and/or throughput) that may be used for a variety of network applications. This significantly reduces the network measurement overhead and is scalable for large packet networks. These and other aspects of the present disclosure are described in greater detail below in connection with the examples of FIGS. 1-5.

Figure 1:
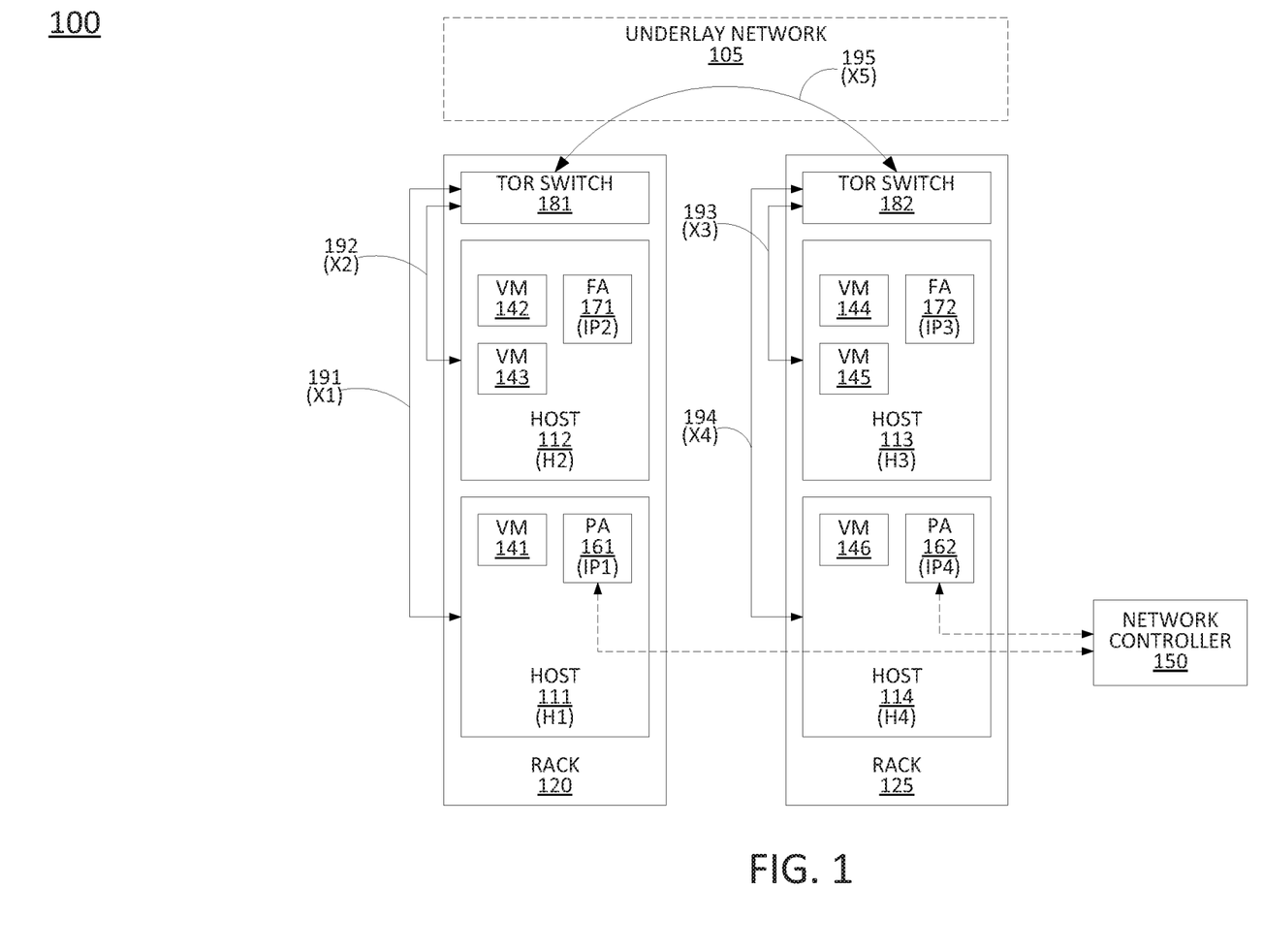
FIG. 1 illustrates an example system related to the present disclosure.

To further aid in understanding the present disclosure, FIG. 1 illustrates an example system 100 in which examples of the present disclosure for determining a plurality of link performance indicators from a plurality of path measurements may operate. The system 100 may comprise a datacenter and/or cloud computing environment with an underlay network 105, which may comprise gateways, spines, leafs, etc., and which may interconnect a plurality of racks, including at least rack 120 and rack 125, via top-of-rack (TOR) switches, e.g., top-of-rack switches 181 and 182. For instance, the system 100 of FIG. 1 may represent a portion of an overall system/network comprising co-located equipment residing within a same datacenter. Each of the racks 120 and 125 may include a plurality of hosts comprising physical devices (e.g., servers) which may host a plurality of applications, containers, virtual machines (VMs), or the like. For instance, rack 120 includes at least hosts 111 (H1) and 112 (H2), while rack 125 includes at least hosts 113 (H3) and 114 (H4). The hosts 111-114 may be configured to run VMs 141-146, as illustrated. In addition, hosts 111-114 may also host/be configured to run probing agents and/or forwarding agents, respectively. For instance, a first probing agent (PA) 161 having IP address IP1 is instantiated via host 111, a second probing agent (PA) 162 having IP address IP4 is instantiated via host 114, a first forwarding agent (FA) 171 having IP address IP2 is instantiated via host 112, and a second forwarding agent (FA) 172 having IP address IP3 is instantiated via hosts 113.

Each of the hosts 111-114 is connected to a respective top-of-rack switch 181 or 182 via a respective one of the links 191-194. As further illustrated in FIG. 1, top-of-rack switches 181 and 182 are interconnected via another link, link 195, via the underlay network 105. Thus, any of the hosts 111-114 (and hence any of the agents on the hosts 111-114) may transmit and receive packet data among each other via the set of links 191-195 and top-of-rack switches 181 and 182. As further illustrated in FIG. 1, the system 100 may include a network controller 150 in communication with probing agents 161 and 162. The network controller 150 may comprise another VM, application, container, or the like running on a respective one of the hosts 111-114, a different host in rack 120, rack 125, a different rack in a same data center, or another host/server in a different location, and so on. For ease of illustration, and due to the variety of possible configurations for network controller 150, only logical links to probing agents 161 and 162 are shown in FIG. 1.

In accordance with the present disclosure, the system 100 may comprise a packet network, e.g., an IP network, broadly defined as a network that uses Internet Protocol to exchange data packets. Additional example IP networks include Voice over IP (VoIP) networks, Service over IP (SoIP) networks, and the like. In one example, the system 100 may comprise a core network of a telecommunications service provider. In one example, the system 100 may combine core network components of a cellular network with components of a triple play service network; where triple-play services include telephone services, Internet services and television services to subscribers. For example, a core network may functionally comprise a fixed mobile convergence (FMC) network, e.g., an IP Multimedia Subsystem (IMS) network. In addition, system 100 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. System 100 may further comprise a broadcast television network, e.g., a traditional cable provider network or an Internet Protocol Television (IPTV) network, as well as an Internet Service Provider (ISP) network. In one example, system 100 may include a plurality of television (TV) servers (e.g., a broadcast server, a cable head-end), a plurality of content servers, an advertising server (AS), an interactive TV/video on demand (VoD) server, and so forth. In all of these examples, the above-described components may be represented by hosts 111-114 and other non-illustrated components (e.g., additional nodes, servers, and so forth) in rack 120, rack 125, other racks, other data centers, and so on.

Figure 5:
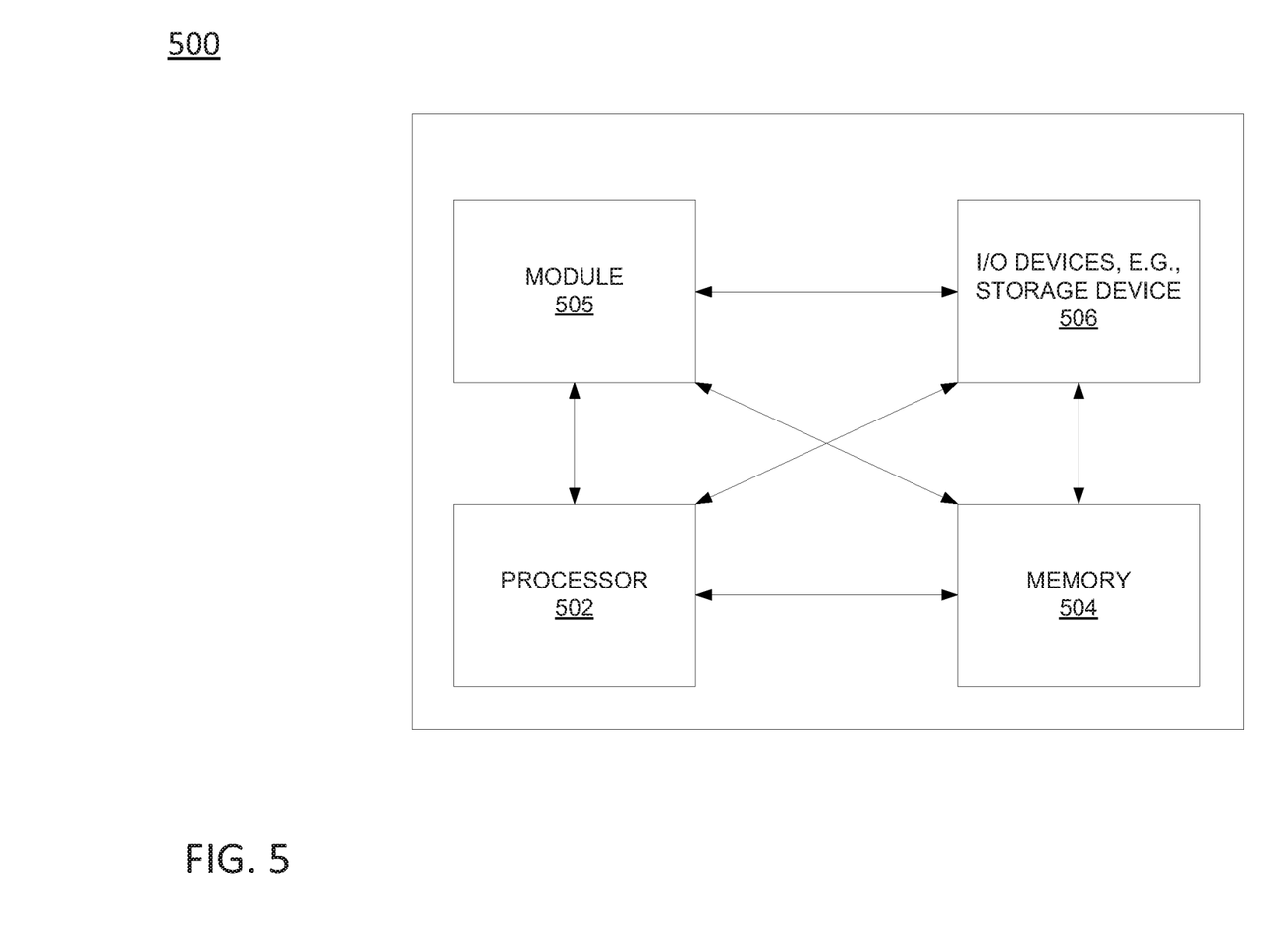
FIG. 5 illustrates a high level block diagram of a computing device specifically programmed to perform the steps, functions, blocks and/or operations described herein.

In one example, the network controller 150 may comprise a computing system or server, such as computing system 500 depicted in FIG. 5, and may be configured to provide one or more operations or functions for determining a plurality of link performance indicators from a plurality of path measurements, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

An example of collecting path measurements and calculating performance indicators via the system 100 may be as follows. Assuming the performance indicator of interest is a per-link delay, the network controller 150 may determine one of a plurality of measurement paths to include a path between host 112 and host 113. Accordingly a sequence of IP addresses corresponding to the path is sent to the source probing agent 161. For instance, the source probing agent 161 may be selected since the source probing agent 161 is within the same rack 120 as the host 112.

Figure 2:
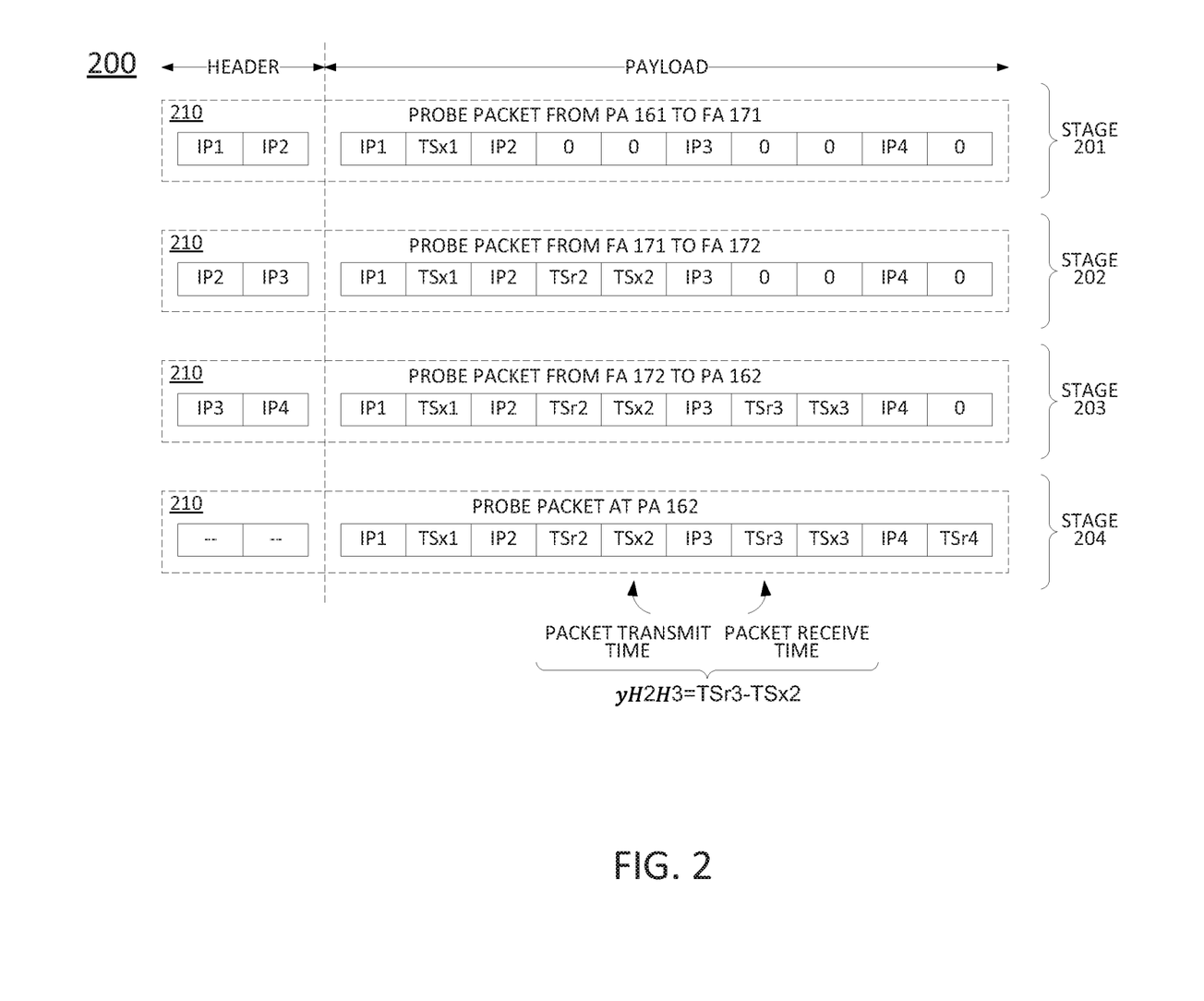
FIG. 2 illustrates an example of routing a probe packet among a plurality of agents in accordance with the present disclosure.

Now also referring to FIG. 2, the figure illustrates a process 200 of routing a probe packet 210 among a plurality of agents (e.g., probing agent 161, forwarding agent 171, forwarding agent 172, and probing agent 162). For instance, at stage 201, probing agent 161 of host 111 may generate and send the probe packet 210 (with timestamp TSx1) to the forwarding agent 171 (FA2) on host 112. At stage 202, forwarding agent 171 may encapsulate the receiving and transmitting timestamps (TSr2 and TSx2, respectively) into the probe packet 210, and forward the probe packet 210 to host 113. Similarly, at stage 203 forwarding agent 172 (FA3) on host 113 may receive the probe packet, encapsulate the receiving and transmitting timestamps into the packet payload, and forward the updated probe packet to probing agent 162 on host 114 (i.e., a destination probing agent). At stage 204, the probing agent 162 may add a timestamp for the time of receiving the packet 210. In addition, in one example, at host 114 and/or at the network controller 150, the delay between host 112 and host 113 may be computed from the probe packet payload information as (yH2H3=TSr3−TSx2). A similar process may be repeated for all measurement paths, with probe packets or probe packet payload information being forwarded from the terminating probe agents (such as probe agent 162) to the network controller 150.

Figure 3:
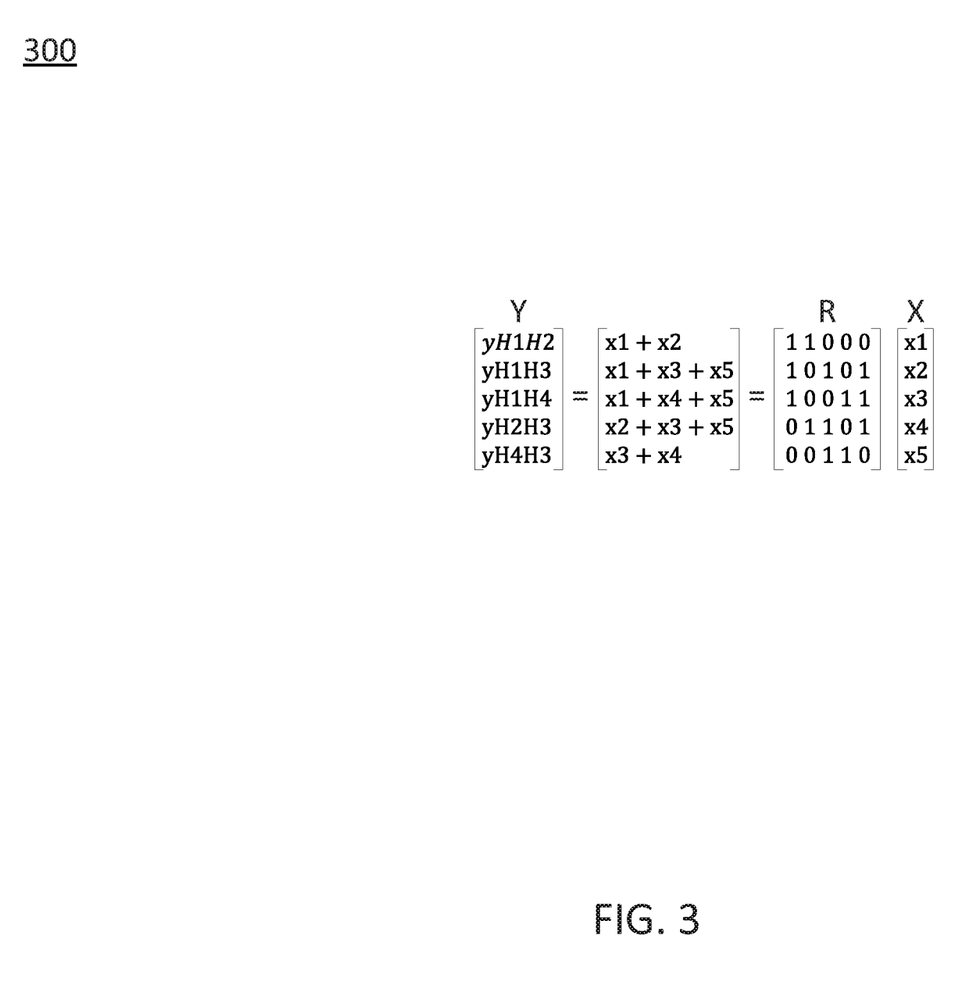
FIG. 3 illustrates an example system of linear equations constructed in accordance with the present disclosure.

Now also referring to FIG. 3, the network controller 150 may construct a linear system of equations 300 in a matrix form such as Y=RX, where Y is a vector of path measurements, R is a routing/observation matrix, and X is a vector unknown link-delays (or in general, unknown individual link performance indicators), where x1-x5 represent the unknown link delays for links 191-195, respectively. In addition, using different network inference techniques, the unknown vector X and per-link performance indicators (e.g., link delays) may then be estimated. In this example, matrix R is full-rank and invertible, that is, measurement paths yH1H2, yH1H3, yH1H4, yH2H3, yH4H3 are optimal, and unknown vector X can be calculated as $X^t = R^{-1} X$ using five path measurements. It should be noted that for the system 100, estimating per-link delays is not feasible using only direct measurement techniques since there are no agents on the top-of-rack switches 181 and 182. For instance, delays on link 195 are not directly measurable.

It should be noted that having the set of measurement paths, and the topology and configuration of the network (e.g., system 100), R is computed by indexing the links 191-195 connecting hosts 111-114 and top-of-rack switches 181 and 182, where the $j^{th}$ entry of the $i^{th}$ row of R is one if xj contributes in the yi, and it is zero otherwise. For instance, the fourth row of R corresponds to the example of a probe packet being sent over the measurement path from forwarding agent 171 in host 112 to forwarding agent 172 in host 113. Similarly, the second row of R corresponds to an example of a probe packet being sent over a measurement path from probing agent 161 in host 111 to forwarding agent 172 in host 113, and so on. It should be noted that each row of R may correspond to a different probe packet and a different measurement path. However, it should also be noted that in connection with the present system 100, certain measurements could alternatively be achieved with a single probe packet and single measurement path instead of two separate probe packets and two measurement paths. For instance, the first row of R relates to a path measurement (i.e., a first entry of Y, yH1H2), between probing agent 161 of host 111 and forwarding agent 171 of host 112, while the fourth row of R relates to a path measurement (i.e., a fourth entry of Y, yH2H3), between forwarding agent 171 in host 112 and forwarding agent 172 in host 113. However, these two different measurement paths could instead be achieved by the network controller 150 and/or the originating probing agent 161 specifying that the path comprises probing agent 161 to forwarding agent 171, and forwarding agent 171 to forwarding agent 172. For instance, the example of FIG. 2 includes such information encoded into the payload of the probe packet 210 as received by the terminating probe agent 162. In any case, the routing matrix R may be constructed from one or more measurement paths, identified by the controller, that one or more probe packets will traverse (as illustrated in FIG. 3), and the unknown vector X may be calculated as $X = R^{-1}Y$.

The example of FIGS. 1-3 illustrates where the network controller 150 may select measurement paths to achieve a full-rank routing matrix R. However, in larger and more complex networks, a less-than-full-rank (rank-deficient) routing matrix may be obtained. The network controller 150 may utilize one or more techniques to calculate or estimate the unknown vector X. For instance, the network processor 150 may utilize a QR factorization, a single value decomposition, a pseudo-inverse of the probe packet routing matrix, an algorithm for solving an optimizer of a cost function, and similar operations to estimate the solution to X. To illustrate, one way to solve Y=RX may be as follows:

$$\hat{X} = \min_X \|Y - RX\|_2 + \lambda \|X\|_2 \qquad \text{Equation 1}$$

where $\lambda$ is a regularization parameter and $\|X\|_2$ denotes the norm-2 of a vector X (with size N) that is defined as $\|X\|_2^2 = \Sigma_{i=1}^N x_i^2$.

Another way to solve Y=RX may be as follows:

$$\hat{X} = \min_X \|Y - RX\|_2 + \lambda \|X\|_1 \qquad \text{Equation 2}$$

where $\lambda$ is a regularization parameter and $\|X\|_1$ denotes the norm-1 of a vector X (with size N) that is defined as $\|X\|_1 = \Sigma_{i=1}^N |x_i|$.

There may be a closed form solution to these optimization problems or an algorithm that can be used to solve/estimate a solution to these optimization problems. In general, a variety of optimization techniques or other methodologies for estimating X may be utilized in accordance with the present disclosure.

In addition, in one example, the network controller 150 may utilize historical measurements of links and/or paths that are available. For instance, the network controller 150 may obtain new measurements for four paths within a current time interval. However, new measurements for a fifth path (e.g., corresponding to the fifth entry in Y and the fifth row of R) may be unavailable. In this case, the network controller 150 may utilize a last or previous measurement for the path that is available, a time weighted moving average of the last several measurements for the path that are available, historical measurements from a same time of day and/or day of the week, and so forth. Alternatively, or in addition, the network controller 150 may estimate the measurement for the path from measurements of one or more nearby links, may extrapolate based upon the measurements from one or more nearby links to adjust for a difference in path length, and so on.

It should be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For instance, portions of system 100 may comprise a content distribution network (CDN) having ingest servers, edge servers, and the like for packet-based video streaming. In another example, system 100 may include a plurality of network controllers. For instance, network controller 150 may be assigned to collect path measurements and calculate performance indicators for a first portion of system 100, a second network controller may be assigned to collect path measurements and calculate performance indicators for a second portion of system 100, and so on. Similarly, although only two racks and four hosts are shown, in other examples, system 100 may include additional racks that are co-located with racks 120 and 125 and/or which reside in different locations and which are interconnected via one or more long-distance links. Thus, these and other modifications are all contemplated within the scope of the present disclosure.

Figure 4:
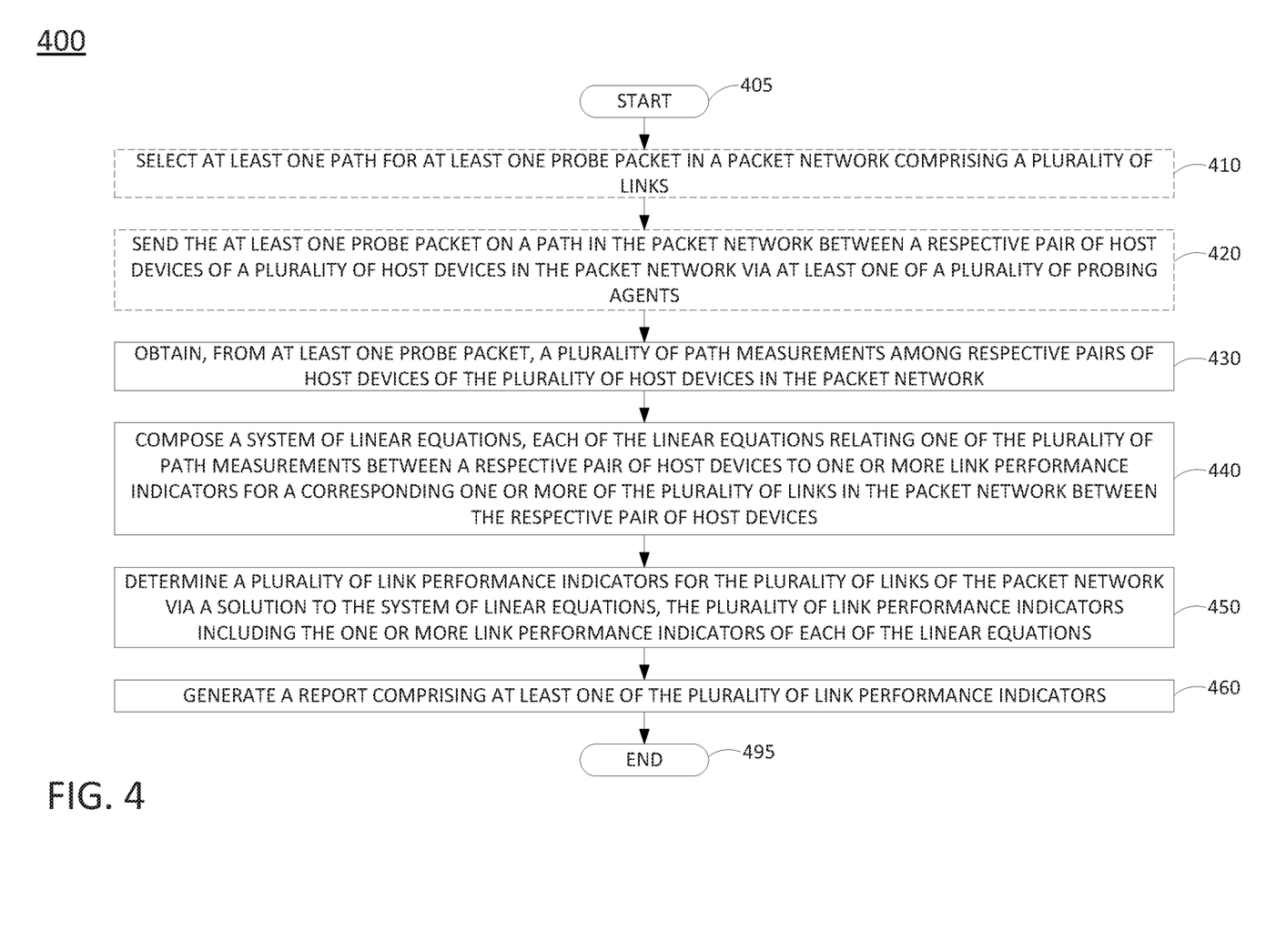
FIG. 4 illustrates a flowchart of an example method for determining a plurality of link performance indicators from a plurality of path measurements.

FIG. 4 illustrates a flowchart of an example method 400 for determining a plurality of link performance indicators from a plurality of path measurements, in accordance with the present disclosure. In one example, the method 400 is performed by a component of the system 100 of FIG. 1, such as by network controller 150, or one of the hosts 111-114, and/or any one or more components thereof (e.g., a processor, or processors, performing operations stored in and loaded from a memory to comprise a probing agent and/or a network controller), or by one of the network controller 150, host 111 and/or probing agent 161, or host 114 and/or probing agent 162 in conjunction with one or more other devices, such as hosts 112 and 113 comprising forwarding agents 171 and 172, and so forth. In one example, the steps, functions, or operations of method 400 may be performed by a computing device or system 500, and/or processor 502 as described in connection with FIG. 5 below. For instance, the computing device or system 500 may represent any one or more components of a network controller 150, hosts 111-114, and/or any other device(s) in FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system. The method 400 begins in step 405 and may proceed to step 410 or to optional step 430.

At optional step 410, the processing system may select at least one path for at least one probe packet for each one of a plurality of path measurements. In one example, the at least one path is selected (e.g., deterministically) to make a probe packet routing matrix (such as matrix R illustrated in FIG. 3), e.g., a full-rank matrix. In one example, the at least one path is selected to maximize a rank of the probe packet routing matrix in accordance with at least one constraint, such as a maximum number of probe packets, a maximum duration of time to collect the plurality of path measurements, a maximum number of links in a path, and so on. In still another example, the at least one path may be randomly selected, and a sufficient number of path measurements may be obtained until a likelihood of a full-rank or sufficiently close to full-rank routing matrix may be obtained (e.g., where the sufficient number of path measurements and/or sufficiency of rank may be configurable parameters set by a network operator).

At optional step 420, the processing system may send the at least one probe packet on the path in the packet network between a respective pair of host devices via at least one of a plurality of probing agents. In one example, the processing system may comprise the at least one of the plurality of probing agents (e.g., an originating probing agent). In another example, the processing system may comprise a network controller, where optional step 420 may comprise sending an instruction to one or more probing agents (e.g., originating probing agent(s)) to generate and send the at least one probe packet.

At step 430, the processing system obtains, from at least one probe packet, a plurality of path measurements among respective pairs of host devices of a plurality of host devices in a packet network comprising a plurality of links. In one example, each of the plurality of path measurements may comprise a packet delay, a packet throughput, or a packet loss ratio between host devices on the path. For throughput or packet loss ratio path measurements, the at least one packet may comprise a plurality of packets. For instance, where at least one path is used, all or a portion of the packets may comprise packets on the same path. Where there are more paths, two or more packets from each of the respective paths may be used. The plurality of packets may be probe packets or may comprise data packets (non-probe packets).

The plurality of host devices may comprise a plurality of probing agents and a plurality of forwarding agents. For instance, each of the plurality of host devices may be configured to operate as a probing agent and/or a forwarding agent in accordance with code, instructions, or the like comprising an application, a VM, a container, etc. Accordingly, in one example, each host device of the respective pair of host devices comprises one of the plurality of probing agents or one of the plurality of forwarding agents. As described above, the plurality of forwarding agents may be configured to record a time of receiving the at least one probe packet from a first host device and a time of sending the at least one probe packet to a second host device. Likewise, the plurality of probing agents may be configured to perform one or both of recording a time of sending the at least one probe packet to a first host device or recording a time of receiving the at least one probe packet from a second host device. For instance, in one example, the processing system may receive the at least one probe packet from at least one of the plurality of probing agents at step 430. In another example, the processing system may comprise at least one of the plurality of probing agents (e.g., a terminating probing agent). The agents (e.g., probing agents and/or forwarding agents) may also be configured to encapsulate other measurements or information relating to the agents' hosts (or host devices) in the at least one probe packet, such as processor utilizations, memory utilizations, a time-to-live of the at least one probe packet, a number of errors detected, a number of errors corrected, a number of scanning attacks detected, an amount of data processed in a time interval, and so forth.

At step 440, the processing system composes a system of linear equations, wherein each of the linear equations relates to one of the plurality of path measurements between a respective pair of host devices of the plurality of host devices to one or more link performance indicators (broadly at least one link performance indicator) for a corresponding one or more of the plurality of links in the packet network between the respective pair of host devices. In one example, the system of linear equations is represented in matrix form (such as illustrated in FIG. 3) equating a vector of the plurality of path measurements with a product of a probe packet routing matrix and a vector of the plurality of link performance indicators. For example, the probe packet routing matrix may comprise a plurality of columns and a plurality of rows, each of the plurality of rows associated with a respective one of the plurality of path measurements. In addition, each of the plurality of rows may comprise an entry of a value of one (1) in a respective column associated with a respective one of the plurality of links, when a path of a respective probe packet of the at least one probe packet for the respective one of the plurality of path measurements includes the respective one of the plurality of links. Otherwise, an entry of a value of zero (0) may be included in the row for the other columns.

At step 450, the processing system determines a plurality of link performance indicators for the plurality of links of the packet network via a solution to the system of linear equations, where the plurality of link performance indicators (e.g., a link delay, a link throughput, or a link loss ratio) comprises the one or more link performance indicators of each of the linear equations. For instance, in one example, step 450 may comprise calculating the solution to the system of linear equations via a product of the vector of the plurality of path measurements and an inverse of the routing matrix (e.g., $X=R^{-1}Y$) as described above. In one example, when the rank of the routing matrix is less than full rank, step 450 may include calculating the solution to the system of linear equations using a QR factorization, a single value decomposition, a pseudo-inverse of the probe packet routing matrix, an algorithm for solving an optimizer of a cost function, or other techniques for solving a system of linear equations with rank-deficiency. Alternatively, or in addition, when the rank is less than full rank, step 450 may include calculating the solution to the system of linear equations in accordance with a prediction, e.g., a linear prediction, for at least one of the plurality of link performance indicators based upon at least one past link performance indicator for at least one of the plurality of links of the packet network.

At step 460, the processing system generates a report comprising at least one of the plurality of link performance indicators. In one example, the report may further include all or a portion of the plurality of link performance indicators. In addition, in one example, the report may include host performance indicators, such as intra-host delays, processor utilization(s), memory utilization(s), a number of dropped packets, a number of scanning attacks detected, and so forth, depending upon additional information, if any, that may be included in probe packets by the agents in the packet network.

Following step 460, the method 400 proceeds to step 495 where the method ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400 by obtaining path measurements, composing and solving a system of linear equations based upon the path measurements to determine link performance indicators, and so on. In another example, the method 400 may be expanded to include sending the report to a network performance monitoring system, such as a software defined network (SDN) controller, a content distribution network (CDN) orchestrator, a network operations center terminal for review by human personnel, a network event detection system, and so on.

In still another example, the method 400 may additionally include various remedial actions to be taken, e.g., performing network anomaly detection and troubleshooting, network load balancing, resource allocation, traffic engineering and/or traffic routing, and so on. For example, the method may reconfigure at least one aspect of the packet network based upon the at least one of the plurality of link performance indicators of the report. For instance, the processing system may comprise an SDN controller that may add at least one additional node to the packet network, remove at least one node from the packet network, change at least one route in the packet network, add at least one route in the packet network, identify at least one node as being faulty, reconfigure at least one node identified as being faulty, and so forth. For instance, a node may be instantiated via network function virtualization infrastructure (NFVI) and may comprise a host having a probe agent and/or a forwarding agent, or may comprise a non-host device for processing packets in the packet network, e.g., a switch or router that is not involved in path measurements, a firewall, a load balancer, and so on. Similarly, changing a route can include rerouting to use a node that is underutilized or to use a new node. Alternatively, or in addition, changing a route may include rerouting to avoid a node that will be removed or that is over-utilized. Changing a route may also include dedicating additional memory and/or processor resources to a queue for a particular link, a particular service, a particular class of traffic, a particular customer's traffic, a particular label-switched route, and so on. Thus, these and other modifications are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing device or processing system specifically programmed to perform the functions described herein. For example, any one or more components or devices illustrated in FIG. 1 or described in connection with the method 400 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for determining a plurality of link performance indicators from a plurality of path measurements, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for determining a plurality of link performance indicators from a plurality of path measurements (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for determining a plurality of link performance indicators from a plurality of path measurements (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   obtaining from at least one probe packet, by a processing system including at least one processor, a plurality of path measurements of a plurality of host devices in a packet network comprising a plurality of links;
   composing, by the processing system, a plurality of linear equations, wherein each of the plurality of linear equations relates one of the plurality of path measurements between a respective pair of host devices of the plurality of host devices to at least one link performance indicator for a corresponding one or more of the plurality of links in the packet network between the respective pair of host devices;
   determining, by the processing system, a plurality of link performance indicators for the plurality of links of the packet network via a solution to the plurality of linear equations, wherein the plurality of link performance indicators comprises the at least one link performance indicator of each of the plurality of linear equations, wherein the plurality of link performance indicators determined via the solution to the plurality of linear equations includes a performance indicator for a link in the packet network that is not on at least one path of the at least one probe packet; and
   generating, by the processing system, a report comprising at least a portion of the plurality of link performance indicators, wherein the at least the portion of the plurality of link performance indicators includes the performance indicator for the link in the packet network that is not on the at least one path of the at least one probe packet.

2. The method of claim 1, wherein each of the plurality of path measurements comprises:
   a packet delay;
   a packet throughput; or
   a packet loss ratio; and
   wherein each of the plurality of link performance indicators comprises:
   a link delay;
   a link throughput; or
   a link loss ratio.

3. The method of claim 1, wherein the plurality of host devices comprises:
   a plurality of probing agents, and
   a plurality of forwarding agents, wherein each host device of the respective pair of host devices of the plurality of host devices comprises one of the plurality of probing agents or one of the plurality of forwarding agents.

4. The method of claim 3, wherein the plurality of probing agents and the plurality of forwarding agents comprise virtual components or non-virtual components.

5. The method of claim 3, wherein the plurality of forwarding agents is configured to record a time of receiving the at least one probe packet from a first host device of the plurality of host devices and a time of sending the at least one probe packet to a second host device of the plurality of host devices; and
   wherein the plurality of probing agents is configured to perform at least one of:
   record a time of sending the at least one probe packet to the first host device; or
   record a time of receiving the at least one probe packet from the second host device.

6. The method of claim 5, wherein each of the plurality of the forwarding agents or the plurality of probing agents is further configured to encapsulate additional information into the at least one probe packet comprising at least one of:
   a processor utilization of a respective host device;
   a memory utilization of the respective host device;
   a time-to-live of the at least one probe packet;
   a number of errors detected;
   a number of errors corrected; or
   an amount of data processed in a time interval.

7. The method of claim 3, further comprising:
   sending the at least one probe packet on the at least one path in the packet network including the respective pair of host devices via at least one of the plurality of probing agents.

8. The method of claim 3, wherein the processing system receives the at least one probe packet from at least one of the plurality of probing agents.

9. The method of claim 3, wherein the processing system comprises at least one of the plurality of probing agents.

10. The method of claim 1, wherein the plurality of linear equations is represented in a matrix form equating a vector of the plurality of path measurements with a product of a probe packet routing matrix and a vector of the plurality of link performance indicators.

11. The method of claim 10, wherein the determining the plurality of link performance indicators comprises:
    calculating the solution to the plurality of linear equations via a product of the vector of the plurality of path measurements and an inverse of the probe packet routing matrix.

12. The method of claim 10, wherein the probe packet routing matrix comprises:
    a plurality of columns; and
    a plurality of rows, each of the plurality of rows associated with a respective one of the plurality of path measurements, wherein each of the plurality of rows comprises:

an entry of a value of one in a respective column associated with a respective one of the plurality of links, when a path of a respective probe packet of the at least one probe packet for the respective one of the plurality of path measurements includes the respective one of the plurality of links; and an entry of a value of zero in other columns of the plurality of columns.

13. The method of claim 10, further comprising:

for each one of the plurality of path measurements, selecting the at least one path for the at least one probe packet.

14. The method of claim 13, wherein the at least one path is selected to make the probe packet routing matrix into a full-rank matrix.

15. The method of claim 13, wherein the at least one path is selected to maximize a rank of the probe packet routing matrix in accordance with at least one constraint, wherein the at least one constraint comprises:

a maximum number of probe packets;

a maximum duration of time to collect the plurality of path measurements; or a maximum number of links in a path.

16. The method of claim 15, wherein, when the rank is less than a full rank, the determining the plurality of link performance indicators comprises calculating the solution to the plurality of linear equations via at least one of:

a QR factorization, including a decomposition of the probe packet routing matrix into an orthogonal matrix and a triangular matrix;

a single value decomposition;

a pseudo-inverse of the probe packet routing matrix; or an algorithm for solving an optimizer of a cost function.

17. The method of claim 15, wherein, when the rank is less than a full rank, the determining the plurality of link performance indicators comprises calculating the solution to the plurality of linear equations in accordance with a linear prediction for at least one of the plurality of link performance indicators based upon at least one past link performance indicator for at least one of the plurality of links of the packet network.

18. A non-transitory computer-readable medium storing instructions which, when executed by a processing system including at least one processor, cause the processing system to perform operations, the operations comprising:

obtaining from at least one probe packet a plurality of path measurements of a plurality of host devices in a packet network comprising a plurality of links;

composing a plurality of linear equations, wherein each of the plurality of linear equations relates one of the plurality of path measurements between a respective pair of host devices of the plurality of host devices to at least one link performance indicator for a corresponding one or more of the plurality of links in the packet network between the respective pair of host devices;

determining a plurality of link performance indicators for the plurality of links of the packet network via a solution to the plurality of linear equations, wherein the plurality of link performance indicators comprises the at least one link performance indicator of each of the plurality of linear equations, wherein the plurality of link performance indicators determined via the solution to the plurality of linear equations includes a performance indicator for a link in the packet network that is not on at least one path of the at least one probe packet; and generating a report comprising at least a portion of the plurality of link performance indicators, wherein the at least the portion of the plurality of link performance indicators includes the performance indicator for the link in the packet network that is not on the at least one path of the at least one probe packet.

19. A processing system comprising:

at least one processor; and a computer-readable medium storing instructions which, when executed by the at least one processor, cause the at least one processor to perform operations, the operations comprising:

obtaining from at least one probe packet a plurality of path measurements of a plurality of host devices in a packet network comprising a plurality of links;

composing a plurality of linear equations, wherein each of the plurality of linear equations relates one of the plurality of path measurements between a respective pair of host devices of the plurality of host devices to at least one link performance indicator for a corresponding one or more of the plurality of links in the packet network between the respective pair of host devices;

determining a plurality of link performance indicators for the plurality of links of the packet network via a solution to the plurality of linear equations, wherein the plurality of link performance indicators comprises the at least one link performance indicator of each of the plurality of linear equations, wherein the plurality of link performance indicators determined via the solution to the plurality of linear equations includes a performance indicator for a link in the packet network that is not on at least one path of the at least one probe packet; and generating a report comprising at least a portion of the plurality of link performance indicators, wherein the at least the portion of the plurality of link performance indicators includes the performance indicator for the link in the packet network that is not on the at least one path of the at least one probe packet.

20. The processing system of claim 19, wherein each of the plurality of path measurements comprises:

a packet delay;

a packet throughput; or a packet loss ratio; and wherein each of the plurality of link performance indicators comprises:

a link delay;

a link throughput; or a link loss ratio.

* * * * *